US006823474B2

(12) United States Patent
Kampe et al.

(10) Patent No.: US 6,823,474 B2
(45) Date of Patent: Nov. 23, 2004

(54) METHOD AND SYSTEM FOR PROVIDING CLUSTER REPLICATED CHECKPOINT SERVICES

(75) Inventors: Mark A. Kampe, Los Angeles, CA (US); Frederic Herrmann, Palo Alto, CA (US); Stephane Brossier, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 481 days.

(21) Appl. No.: 09/846,665

(22) Filed: May 2, 2001

(65) Prior Publication Data

US 2002/0032883 A1 Mar. 14, 2002

Related U.S. Application Data

(60) Provisional application No. 60/201,099, filed on May 2, 2000, and provisional application No. 60/201,092, filed on May 2, 2000.

(51) Int. Cl.[7] .............................................. G06F 11/00
(52) U.S. Cl. ............................... 714/13; 714/15; 714/6
(58) Field of Search ............................ 714/20, 13, 15, 714/16, 6

(56) References Cited

U.S. PATENT DOCUMENTS

| 5,440,726 A | * | 8/1995 | Fuchs et al. .................. 714/20 |
| 5,590,277 A | | 12/1996 | Fuchs et al. ............ 395/183.14 |
| 5,621,885 A | * | 4/1997 | Del Vigna, Jr. ............... 714/13 |
| 5,737,514 A | * | 4/1998 | Stiffler ........................ 714/13 |
| 5,740,348 A | | 4/1998 | Cunliffe et al. ........ 395/182.04 |
| 5,845,292 A | * | 12/1998 | Bohannon et al. .......... 707/202 |
| 6,016,500 A | * | 1/2000 | Waldo et al. ................ 707/202 |
| 6,145,094 A | | 11/2000 | Shirriff et al. ................ 714/11 |
| 6,163,856 A | | 12/2000 | Dion et al. ..................... 714/4 |
| 6,292,905 B1 | | 9/2001 | Wallach et al. |
| 6,308,282 B1 | | 10/2001 | Huang et al. |
| 6,380,331 B1 | | 3/2002 | Vert et al. |
| 6,446,134 B1 | | 9/2002 | Nakamura |
| 6,594,779 B1 | * | 7/2003 | Chandra et al. ............... 714/15 |
| 6,691,245 B1 | * | 2/2004 | DeKoning ..................... 714/6 |
| 2002/0138704 A1 | * | 9/2002 | Hiser et al. ................. 711/162 |

OTHER PUBLICATIONS

H. V. Jagadish et al., "Dalí: A High Performance Main Memory Storage Manager," Proceedings of the 20th VLDB Conference Santiago, Chile 1994, pp. 1–12.

P. Bohannon et al., "The Architecture of the Dalí Main Memory Storage Manager," Multimedia Tools and Applications, vol. 4, No. 2, pp. 115–151 (reprinted as pp. 1–36), Mar. 1997.

XP–000765512—A.–M. Kermarrec et al. "Design, Implementation and Evaluation of ICARE: An Efficient Recoverable DSM," Software Practice and Experience, vol. 28(9), pp. 981–1010, Jul. 25, 1998.

XP–10371114—L.E. Moser et al. "Eternal: Fault Tolerance and Live Upgrades for Distributed Object Systems," IEEE, pp. 184–196, 1999.

* cited by examiner

Primary Examiner—Robert Beausoliel
Assistant Examiner—Marc M Duncan
(74) Attorney, Agent, or Firm—Kent A. Lembke; William J. Kubida; Hogan & Hartson LLP

(57) ABSTRACT

The present invention describes a method and system for providing cluster replicated checkpoint services. In particular, the method provides cluster replicated checkpoint services for replicas of a checkpoint in a cluster. The cluster includes a first node and a second node, which are connected to one another via a network. The replicas include a primary replica and a secondary replica. The method includes managing the checkpoint that contains checkpoint information, and creating the primary replica in a memory of the first node. The primary replica contains first checkpoint information. The method also includes updating the primary replica so that the first checkpoint information corresponds to the checkpoint information, creating the secondary replica that contains second checkpoint information in a memory of the second node, and updating the secondary replica so that the second checkpoint information corresponds to the checkpoint information.

41 Claims, 6 Drawing Sheets

METHOD AND SYSTEM FOR PROVIDING CLUSTER REPLICATED CHECKPOINT SERVICES

CROSS REFERENCE TO RELATED APPLICATIONS

This application claims the benefit of U.S. Provisional Application Nos. 60/201,092 and 60/201,099, which were filed on May 2, 2000, and which are hereby incorporated by reference.

BACKGROUND OF THE INVENTION

1. Field of the Invention

The present invention relates to a method and system for providing cluster replicated checkpoint services. In particular, the present invention relates to a cluster replicated checkpoint service ("CRCS"), which provides services for components to maintain checkpoint and its replicas. In so doing, the CRCS allows components to recover promptly and seamlessly from failures, and thus ensures high-availability of services provided by them.

2. Discussion of the Related Art

Networked computer systems enable users to share resources and services. One computer can request and use resources or services provided by another computer. The computer requesting and using the resources or services provided by another computer is typically known as a client, and the computer providing resources or services to another computer is known as a server.

A group of independent network servers may be used to form a cluster. Servers in a cluster are organized so that they operate and appear to clients, as if they were a single unit. A cluster and its network may be designed to improve network capacity, by among other things, enabling the servers within a cluster to shift work in order to balance the load. By enabling one server to take over for another, a cluster may be used to enhance stability and minimize downtime caused by an application or system failure.

Today, networked computer systems including clusters are used in many different aspects of our daily lives. They are used, for example, in business, government, education, entertainment, and communication. As networked computer systems and clusters become more prevalent and our reliance on them increases, it has become increasingly more important to achieve the goal of always-on computer networks, or "high-availability" systems.

High-availability systems need to detect and recover from a failure in a way transparent to its users. For example, if a server in a high-availability system fails, the system must detect and recover from the failure with no or little impact on clients.

Various methods have been devised to achieve high availability in networked computer systems including clusters. For example, one method known as triple module redundancy, or "TMR," is used to increase fault tolerance at the hardware level. Specifically, with TMR, three instances of the same hardware module concurrently execute and by comparing the results of the three hardware modules and using the majority results, one can detect a failure of any of the hardware modules. However, TMR does not detect and recover from a failure of software modules. Another method for achieving high availability is software replication, in which a software module that provides a service to a client is replicated on at least two different nodes in the system. While software replication overcomes some disadvantages of TMR, it suffers from its own problems, including the need for complex software protocols to ensure that all of the replicas have the same state.

The use of replication of hardware or software modules to achieve high-availability raises a number of new problems including management of replicated hardware and software modules. The management of replicas has become increasingly difficult and complex, especially if replication is done at the individual software and hardware level. Further, replication places a significant burden on system resources.

When replication is used to achieve high availability, one needs to manage redundant components and have an ability to assign work from failing components to healthy ones. However, telling a primary component to restart or a secondary component to take over, is not sufficient to ensure continuity of services. To achieve a seamless fail-over, the successor needs to pick-up where the failing component left off. This means that secondary components need to know what the last stable state of the primary component was.

One way of passing information regarding the state of the primary component is to use checkpoints. A checkpoint may be a file containing information that describes the state of the primary component at a particular time. Because checkpoints play a crucial role in achieving high-availability, there is a need for a system and method for providing reliable and efficient cluster replicated checkpoint services to achieve high availability.

SUMMARY OF THE INVENTION

The present invention provides a system and method for providing cluster replicated checkpoint services. In particular, the present invention provides a cluster replicated checkpoint service for managing a checkpoint and its replicas to make a cluster highly available.

To achieve these and other advantages and in accordance with the purposes of the present invention, as embodied and broadly described herein, the present invention describes a method for providing cluster replicated checkpoint services for replicas of a checkpoint in a cluster. The cluster includes a first node and a second node, which are connected to one another via a network. The replicas include a primary replica and a secondary replica. The method includes managing the checkpoint that contains checkpoint information, and creating the primary replica in a memory of the first node. The primary replica contains first checkpoint information. The method also includes updating the primary replica so that the first checkpoint information corresponds to the checkpoint information, creating the secondary replica that contains second checkpoint information in a memory of the second node, and updating the secondary replica so that the second checkpoint information corresponds to the checkpoint information.

In another aspect, the invention includes a method for providing cluster replicated checkpoint services for replicas of a checkpoint in a cluster. The cluster includes a first node and a second node, which are connected to one another via a network. The replicas include a primary replica and a secondary replica. The method includes creating the checkpoint, opening the checkpoint from the first node in a write mode, and creating the primary replica in a memory of the first node. It also includes updating the checkpoint, updating the primary replica, and propagating a checkpoint message that includes information regarding the checkpoint. Further, the method includes opening the checkpoint from the second node in a read mode, creating the secondary replica in a memory of the second node, and updating the secondary replica based on the checkpoint message.

In yet another aspect, the invention includes a computer program product configured to provide cluster replicated checkpoint services for replicas of a checkpoint in a cluster. The cluster includes a first node and a second node, which are connected to one another via a network. The replicas include a primary replica and a secondary replica. The computer program product includes computer readable program codes configured to: (1) manage the checkpoint that contains checkpoint information; (2) create the primary replica with first checkpoint information in a memory of the first node; (3) update the primary replica so that the first checkpoint information corresponds to the checkpoint information; (4) create the secondary replica with second checkpoint information in a memory of the second node; and (5) update the secondary replica so that the second checkpoint information corresponds to the checkpoint information. The computer program product also includes a computer readable medium in which the computer readable program codes are embodied.

In further aspect, the invention includes a computer program product configured to provide cluster replicated checkpoint services for replicas of a checkpoint in a cluster. The cluster includes a first node and a second node, which are connected to one another via a network. The replicas include a primary replica and a secondary replica. The computer program product includes computer readable program codes configured to: (1) create the checkpoint; (2) open the checkpoint from the first node in a write mode; (3) create the primary replica in a memory of the first node; (4) update the checkpoint; (5) update the primary replica; and (6) propagate a checkpoint message that includes information regarding the checkpoint. The computer program product further includes computer readable program codes configured to: (1) open the checkpoint from the second node in a read mode; (2) create the secondary replica in a memory of the second node; and (3) update the secondary replica based on the checkpoint message. It also includes a computer readable medium in which the computer readable program codes are embodied.

In yet further aspect, the invention includes a system for providing cluster replicated checkpoint services for replicas of a checkpoint in a cluster. The cluster includes a first node and a second node, which are connected to one another via a network. The replicas include a primary replica and a secondary replica. The system includes means for: (1) managing the checkpoint with checkpoint information; (2) creating the primary replica with first checkpoint information in a memory of the first node; (3) updating the primary replica so that the first checkpoint information corresponds to the checkpoint information; (4) creating the secondary replica with second checkpoint information in a memory of the second node; and (5) updating the secondary replica so that the second checkpoint information corresponds to the checkpoint information.

In another aspect, the invention includes a system for providing cluster replicated checkpoint services for replicas of a checkpoint in a cluster. The cluster includes a first node and a second node, which are connected to one another via a network. The replicas include a first replica and a second replica. The system includes means for: (1) creating the checkpoint; (2) opening the checkpoint from the first node in a write mode; (3) creating the primary replica in a memory of the first node; (4) updating the checkpoint; (5) updating the primary replica; (6) propagating a checkpoint message with information regarding the checkpoint; (7) opening the checkpoint from the second node in a read mode; (8) creating the secondary replica in a memory of the second node; and (9) updating the secondary replica based on the checkpoint message.

Finally, in another aspect, the invention includes a system for managing a checkpoint. The system includes a first node running a primary component, including a primary replica having first checkpoint information in its memory, having a first checkpoint service, and connected to a network. The system also includes a second node running a secondary component, including a secondary replica in its memory, having a second checkpoint service, and connected to the network. The first checkpoint service and the second checkpoint service are capable of accessing the checkpoint. The first checkpoint service works with the primary component to update a checkpoint, issue a checkpoint message containing information regarding the checkpoint, asynchronously propagate the checkpoint message, and update the first replica. The second checkpoint service is capable of updating the secondary replica based on the checkpoint message.

Additional features and advantages of the invention are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference is now made in detail to the preferred embodiment of the present invention, examples of which are illustrated in the accompanying drawings.

Figure 1:
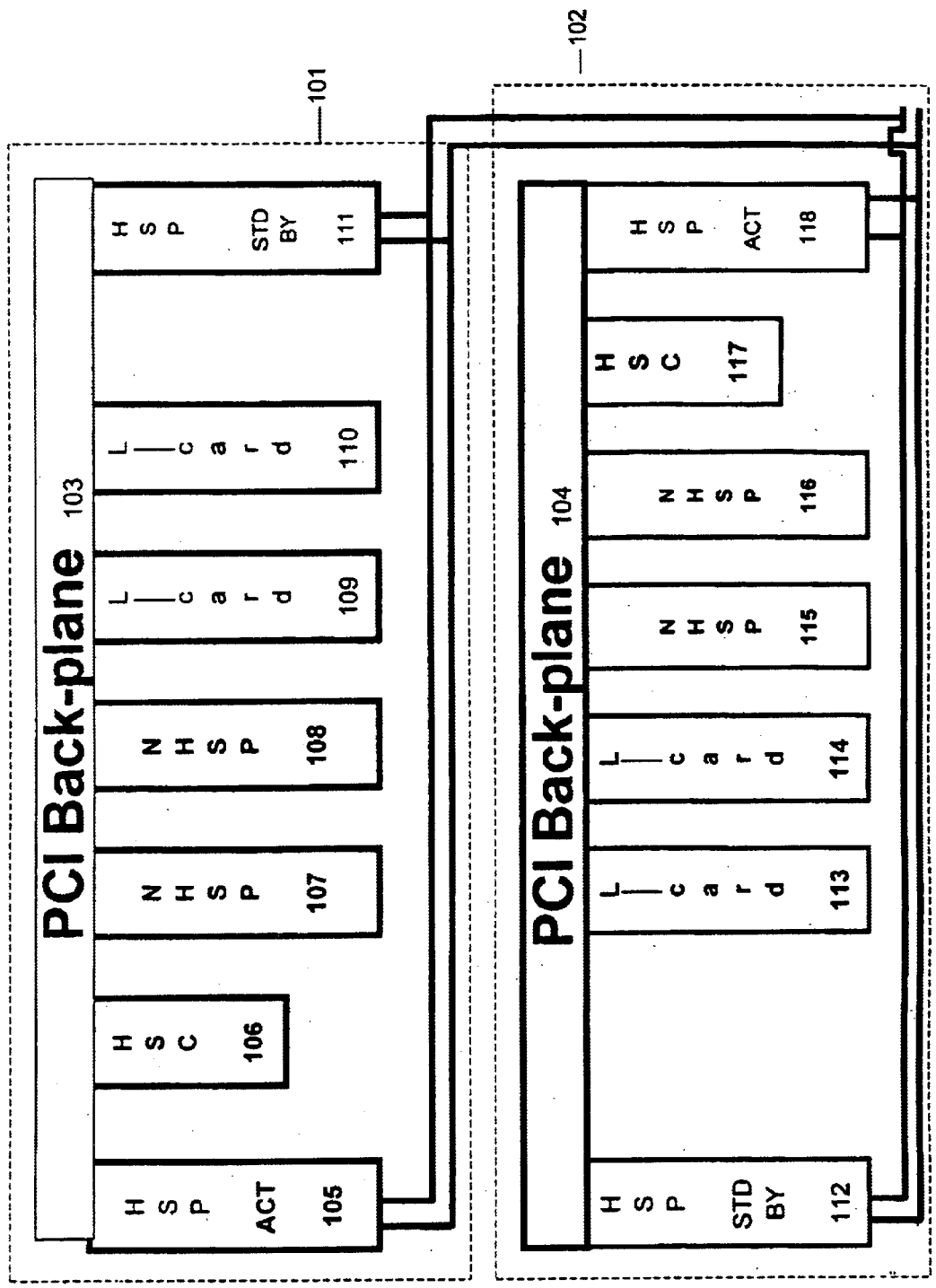
FIG. 1 is a simplified representational drawing of a cluster that may serve as an operating environment for the present invention.

FIG. 1 is a simplified representational drawing of a cluster in which the present invention may be used. It is important to note that the cluster shown in FIG. 1 is merely an example and that the present invention may be utilized in a much larger or smaller cluster or networked computer systems. In other words, the present invention does not depend on the architecture of an underlying cluster or a networked computer system.

The cluster of FIG. 1 has two independent shelves 101 and 102, which are interconnected by a network. Each shelf may include: (1) one compact PCI ("cPCI") back-plane (103 and 104); (2) redundant power supplies and fans; (3) one dual-ported, hot-swap controller ("HSC") (106 and 117), which manages the power to the slots, as well as the power supplies, fans, and environment alarms; (4) a bus-switch, permitting the bus to be managed by one of two host-slot processors; (5) two hot-swap-able host-slot processors ("HSP"), one active (105 and 118) and one standby (111 and 112); (6) two line cards ("L-cards"), which are hot-swap-able (109, 110, 113, and 114); and (7) two-non-host-slot processors ("NHSPs") (107, 108, 115, and 116).

Nodes within a single shelf would communicate across the cPCI back-plane. Communication between nodes on different shelves would use a network, which, for example, can be dual-redundant 100 Mhz ethernets. The HSP nodes would act as gateways, relaying packets between their cPCI back-planes and the ethernets. Further, L-cards may be made 2N-redundant, for example, by making the L-cards 109 and 114 standbys for the L-cards 113 and 110, respectively. NHSPs may be made N+1 redundant, for example, by making the NHSP 116 act as a standby for the other three NHSPs 107, 108, and 115.

Figure 2:
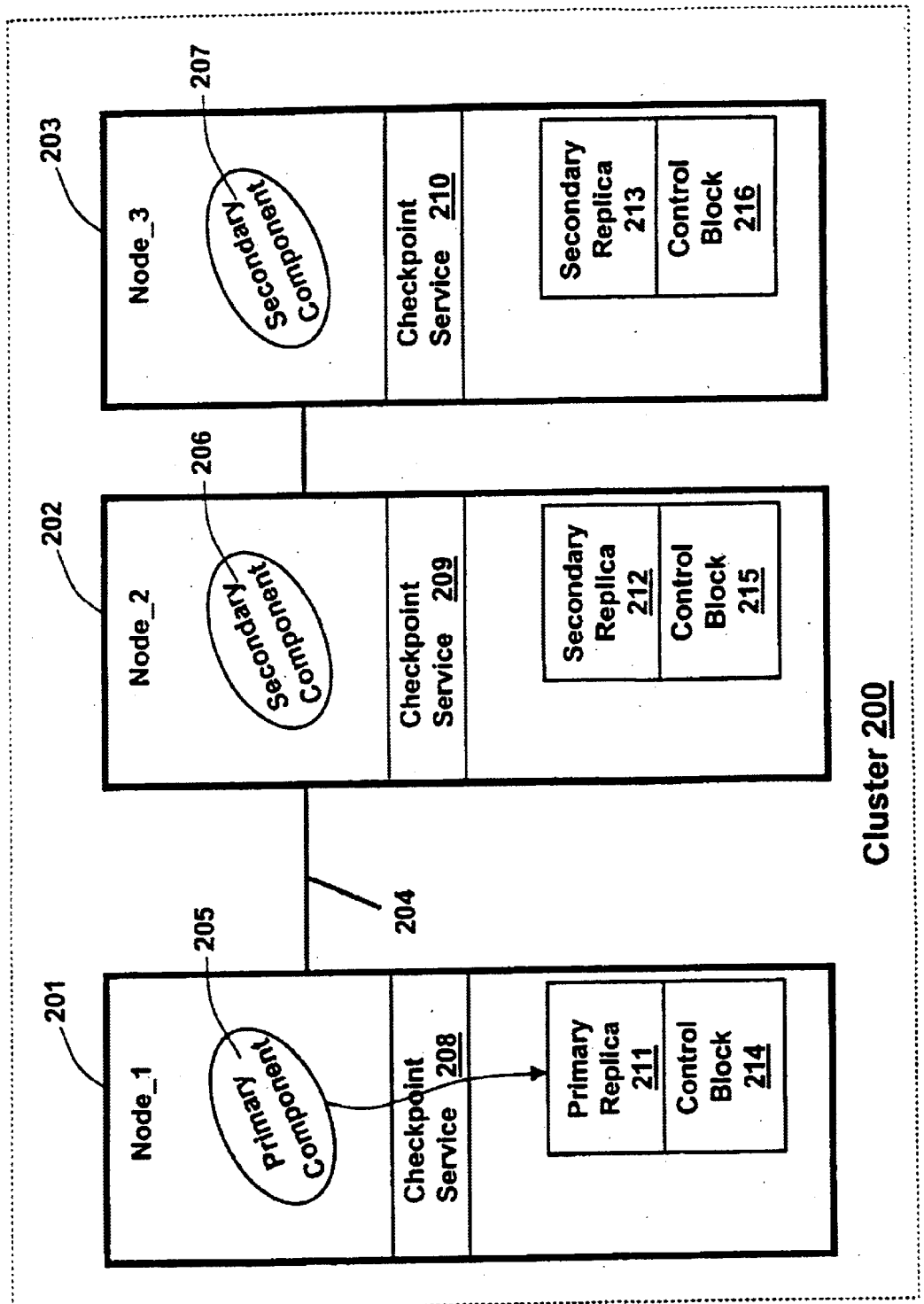
FIG. 2 is a block diagram of a logical view of one operational aspect of a checkpoint management system of the present invention.

Turning to FIG. 2, FIG. 2 depicts a logical view of a checkpoint management system of the present invention. A cluster 200 includes a node_1 201, a node_2 202, and a node_3 203. The node_1 201, node_2 202, and node_3 203 are connected via a network 204. Nodes in a cluster typically are peer nodes—that is, nodes fully participate in intra-cluster services.

The node_1 201 has a cluster replicated checkpoint service, or simply a checkpoint service 208. The checkpoint service 208 is responsible for managing checkpoint replicas on the node_1 201. It may also communicate with checkpoint services on other nodes. In this example, the checkpoint service 208 may communicate with checkpoint services 209 and 210 on the node_2 202 and the node_3 203, respectively. Further, client applications or components may access the checkpoint services 208, 209, and 210 through a CRCS library. The CRCS library may include function calls and/or operations that may be used by client applications or components. In other words, client applications or components may be linked to the CRCS library, and the CRCS library may communicate with the checkpoint services.

A primary component 205 resides within the node_1 201. A primary component is a component that is actively doing real work for the system. A component is an encapsulation of a logical aggregation of functions provided by software, hardware, or both that is designated to behave as a unit of deployment, redundancy, and manageability within a networked computer system. A component may be instantiated into one or multiple component instances. A component instance may be referred to as a component for simplicity.

The node_1 201 further has a primary replica 211, and a control block 214 in its memory. A control block is a piece of memory that is attached to a corresponding replica. The control block is typically used for management purposes. In other words, the control block may be thought of as a scratch pad that a component can use to annotate information regarding a corresponding replica. A control block may be used to store data associated with a corresponding application or component. Data contained in a control block may be independent from data contained in control blocks of other replicas. Further, information in a control block may include information regarding checkpoint parameters or attributes. In FIG. 2, the control block 214 contains information for the primary replica 211.

In one preferred embodiment, control blocks are not replicated. However, their data may be accessed by any node in a cluster. For example, a primary component may access control blocks of replicas used by its secondary counterparts to determine formats that they use for checkpoint information. In FIG. 2, the primary component 205 may access data in control blocks 215 and 216. Similarly, data in the control block 214 may be made accessible to secondary components 206 and 207.

The control block may be used to support an upgrade of a checkpoint service on various nodes. Specifically, a control block may include information regarding a version of a corresponding application and/or information regarding a format of checkpoint information in a corresponding replica. Such version and/or format information may be used to support split-mode and/or rolling upgrades.

A replica is a checkpoint instance that resides on a node where the checkpoint has been opened. Typically, there are as many replicas as there are different nodes on which components have opened the checkpoint. In FIG. 2, the three nodes (i.e. the node_1 201, node_2 202, and node_3 203) have opened the checkpoint and have three checkpoint replicas, namely the primary replica 211, a secondary replica 212, and a secondary replica 213.

A primary replica typically resides in the same node as a primary component. In FIG. 2, the primary replica 211 and the primary component 205 reside in the node_1 201.

The node_2 202 and node_3 203 have the secondary components 206 and 207, respectively. A secondary component is a component that is not actively doing real work for the system, but is tracking checkpoints from a primary component so that it can take over for the primary component if the primary component fails.

The node_2 202 has the checkpoint service 209, the secondary replica 212, and the control block 215. Similarly, the node_3 203 has the checkpoint service 210, the secondary replica 212, and the control block 216. In other words, both the node_2 202 and the node_3 203 have opened the checkpoint and created the secondary replicas 212 and 213, respectively. The secondary replicas 212 and 213 track the primary replica 211, by updating information to reflect change in the checkpoint. Information in the secondary replicas 212 and 213 may be used by the secondary components 206 and 207, respectively, to take over the primary component 201, in case the primary component 201 fails, for example.

A checkpoint may be thought of as being similar to a file or files. A checkpoint may be made accessible on any node in a cluster. For example, its name may be made globally accessible by using a cluster name service. Further, a checkpoint may have any of the following characteristics: (1) it is accessed through a global name; (2) it is seen as a linear data segment; (3) it has attributes that can be specified at creation time and possibly modified later on; (4) it can be opened for read, write, or read/write access (however, at any given time, only one node may have processes which have the checkpoint open for a write mode); (5) it can be read by specifying an offset at which the reading should start and the consecutive number of bytes that should be read; (6) it can be updated and/or written by specifying a number of vectors, each of them representing a continuous range of bytes that should be written; (7) it can be closed; and (8) it can be deleted.

A checkpoint message may be used to update information in secondary replicas. Upon receiving a checkpoint message, secondary replicas may be updated. Typically, operations to update secondary replicas are done asynchronously—i.e., information in the first and the secondary replicas are updated asynchronously. As a result, at any given point, two replicas may not contain the same information. However, one may choose to synchronize replicas on different nodes to ensure consistency of all the replicas of a given checkpoint.

Referring back to FIG. 2, checkpoint messages may be used to update secondary replicas 212 and 213. If they are updated asynchronously, at any given point, the primary replica 211 and the secondary replicas 212 and 213 may not contain the same information.

Figure 3:
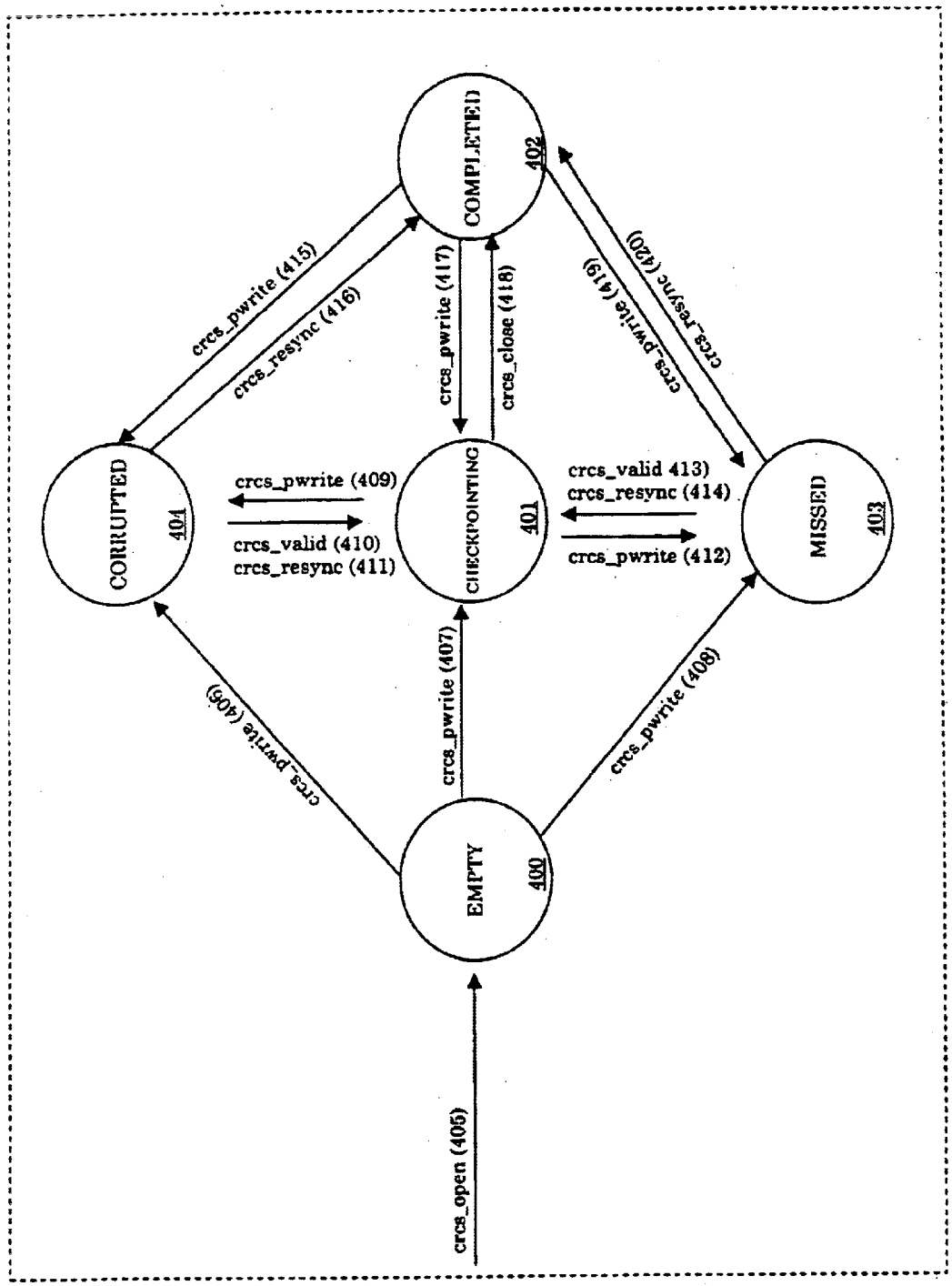
FIG. 3 is a block diagram showing relationships among five checkpoint replica states in accordance with an embodiment of the present invention.

One may associate different states to a checkpoint replica. For example, a replica may have several different states associated with it. Such states may include EMPTY, CORRUPTED, CHECKPOINTING, MISSED, and COMPLETED. These different state values may reflect whether or not certain operation on a replica is performed successfully. FIG. 3 shows relationships among the five different state values. One of ordinary skill in the art will appreciate that state values help manage replicas of a checkpoint, and will modify, delete, and/or add state values according to their needs.

At checkpoint creation time, when no replica exists in a cluster, a local replica may be initialized with 0, and its state may be set to an EMPTY 400 state. A function call crcs_open 405 may be used to perform the creation step.

The function call crcs_open 405 may be defined so that it creates and/or opens a checkpoint and returns a new checkpoint descriptor to access a checkpoint replica on a local node. It may have several arguments, such as a name of the checkpoint to be opened or created, an access mode (i.e., read, write, or read/write), a permission to be used in creating the checkpoint, if necessary, and checkpoint attributes if the checkpoint has to be created. Its arguments may also include an upper bound on the time the call executes, and a location in the caller address space to return the checkpoint descriptor. As to the upper bound on the time limit, if the call cannot complete within the upper bound on the time limit, all related resources may be freed and the call may return with an error. A memory may be allocated for a new replica. It may be initially filled with 0, for example.

If the checkpoint does not exist prior to the function call crcs_open 405, then the function call may create a checkpoint and a checkpoint replica. If the checkpoint exists (i.e., the function call crcs_open 405 merely opens the checkpoint and creates a checkpoint replica), the new replica may be initialized with another valid replica. The crcs_open 405 may block until this initialization has been achieved.

If crcs_pwrite operations (406, 407, and 408) occur during the creation of a new replica, they may be propagated to the new replica after initialization has completed. Upon a successful completion of the crcs_pwrite operation (407), the state may be set to CHECKPOINTING 401 or COMPLETED 402. If the crcs_pwrite operations fail (406 and 408), the state may go to CORRUPTED 404 or MISSED 403. The CORRUPTED 404 and MISSED 403 states are invalid states.

The checkpoint replica initially in the EMPTY 400 state may enter into the CHECKPOINTING 401 state after a first successful crcs_pwrite operation (407). The crcs_pwrite operation may be used to update information in a checkpoint replica and is discussed in detail below. The checkpoint replica may remain in the CHECKPOINTING 401 state, until a crcs_pwrite error occurs (409 and 412) or until the last writer closes the checkpoint using a crcs_close (418) function call. Upon a crcs_pwrite error (409 and 412), the state of the checkpoint replica may be changed to MISSED 403 or CORRUPTED 404. When the last writer closes the checkpoint, the checkpoint replica may go to the COMPLETED 402 state.

If only a part of the data corresponding to a crcs_pwrite operation can be written to the replica or if the synchronization of the replica as a result of a crcs_open operation fails (i.e., 406, 409, or 415), the state of the replica may be set to the CORRUPTED 404 state. A replica in the CORRUPTED 404 state may enter the CHECKPOINTING 401 state after a successful completion of a crcs_valid 410 or crcs_resync 411 function call. Alternatively, it may enter the COMPLETED 402 state after a successful completion of a crcs_resync 416 function call. The crcs-valid and crcs_resync function calls are described in detail below.

When a crcs_pwrite function call cannot be propagated to a remote replica because of network congestion or a temporary network failure (i.e., 408, 412 or 419), for example, the state of the remote replica may be set to MISSED 403. A replica in the MISSED 403 state may go to the CHECKPOINTING 401 state after a successful completion of a crcs_valid 413 or crcs_resync 414 function call. Alternatively, it may go to the COMPLETED 402 state after a successful completion of a crcs_resync 420 function call. In one implementation, a replica in the MISSED 403 state is not updated until its state changes the CHECKPOINTING 401 state.

A replica may enter into the COMPLETED 402 state when one of the following situation occurs: (1) its previous state was CHECKPOINTING 401, and the last process which had the checkpoint open for writing has closed it by using a crcs_close 418 function call; or (2) its previous state was CORRUPTED 404 or MISSED 403, and an explicit crcs_resync operation (416 or 420) has been performed, triggering synchronization with a replica in the COMPLETED 402 state.

Finally, a replica in the COMPLETED 402 state may move to CHECKPOINTING 401, CORRUPTED 404, or MISSED 403 state. The replica goes to the CHECKPOINTING 401 state upon a successful crcs_pwrite 417 function call. The replica goes to the CORRUPTED 404 or MISSED 403 state, when an error occurs in a crcs_pwrite (415 or 419) function call.

Figure 4A:
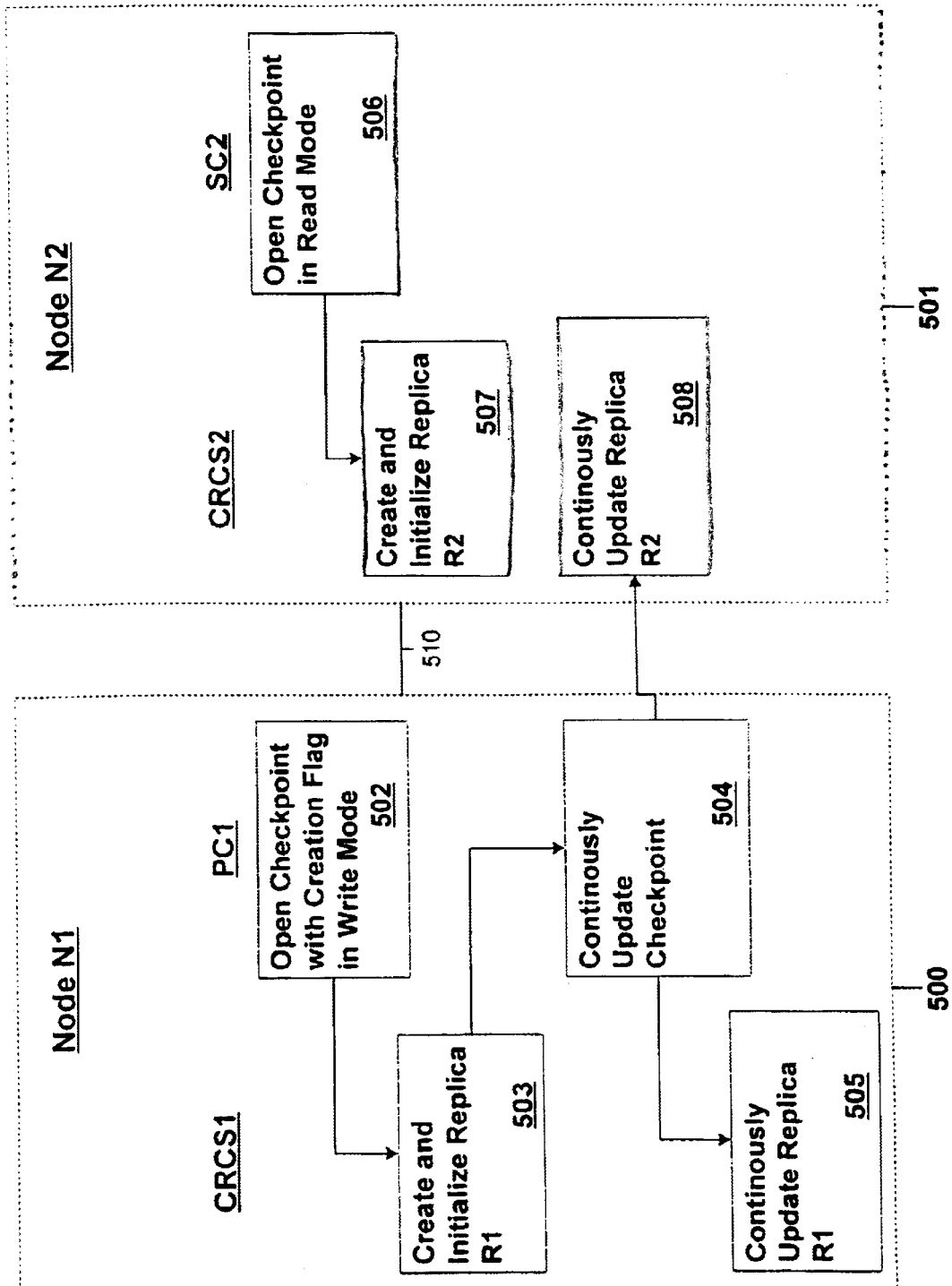
FIGS. 4A, 4B, and 4C are flow charts illustrating some of operations involved in managing a checkpoint and its replicas in accordance with one embodiment of the present invention.
Figure 4B:
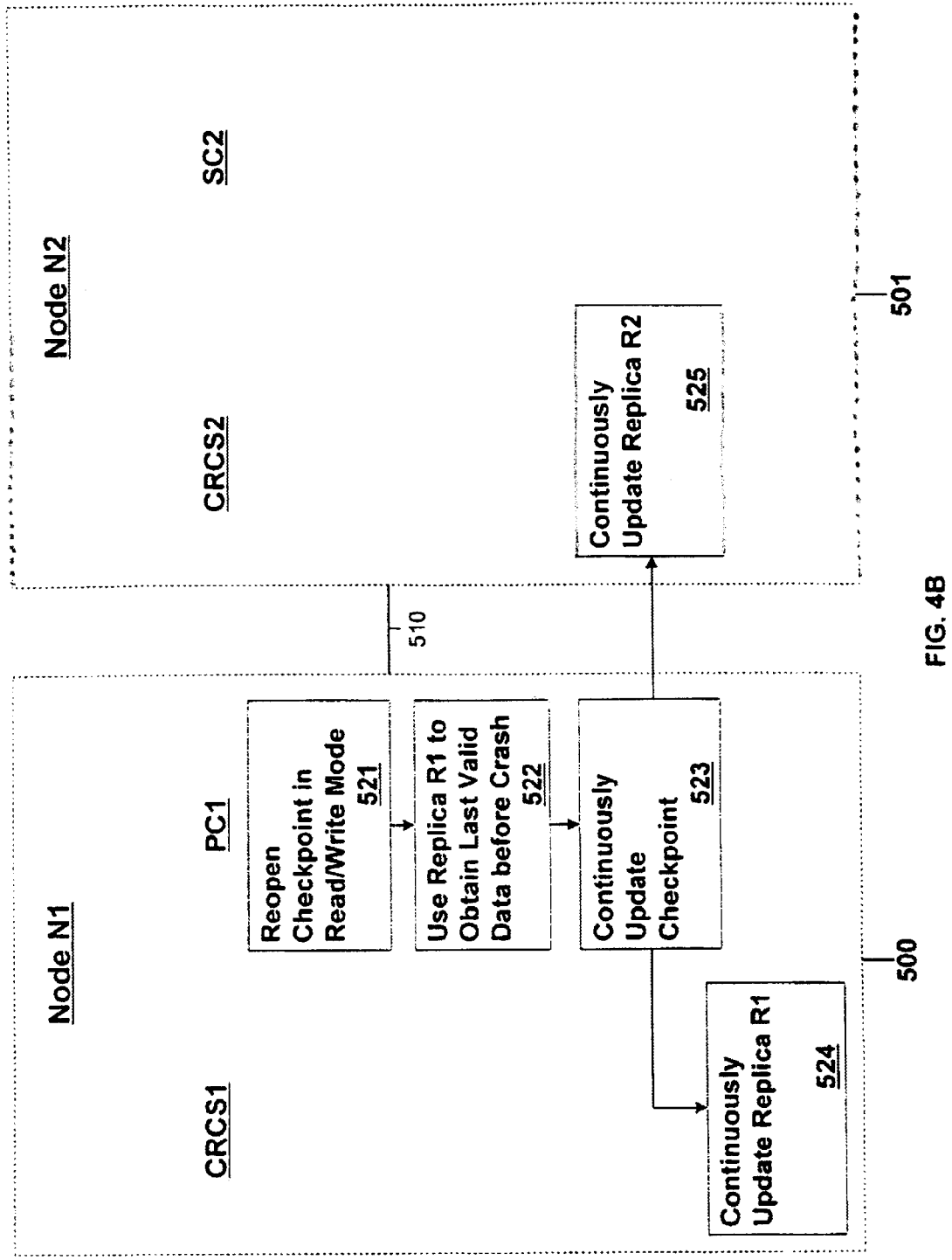
Figure 4C:
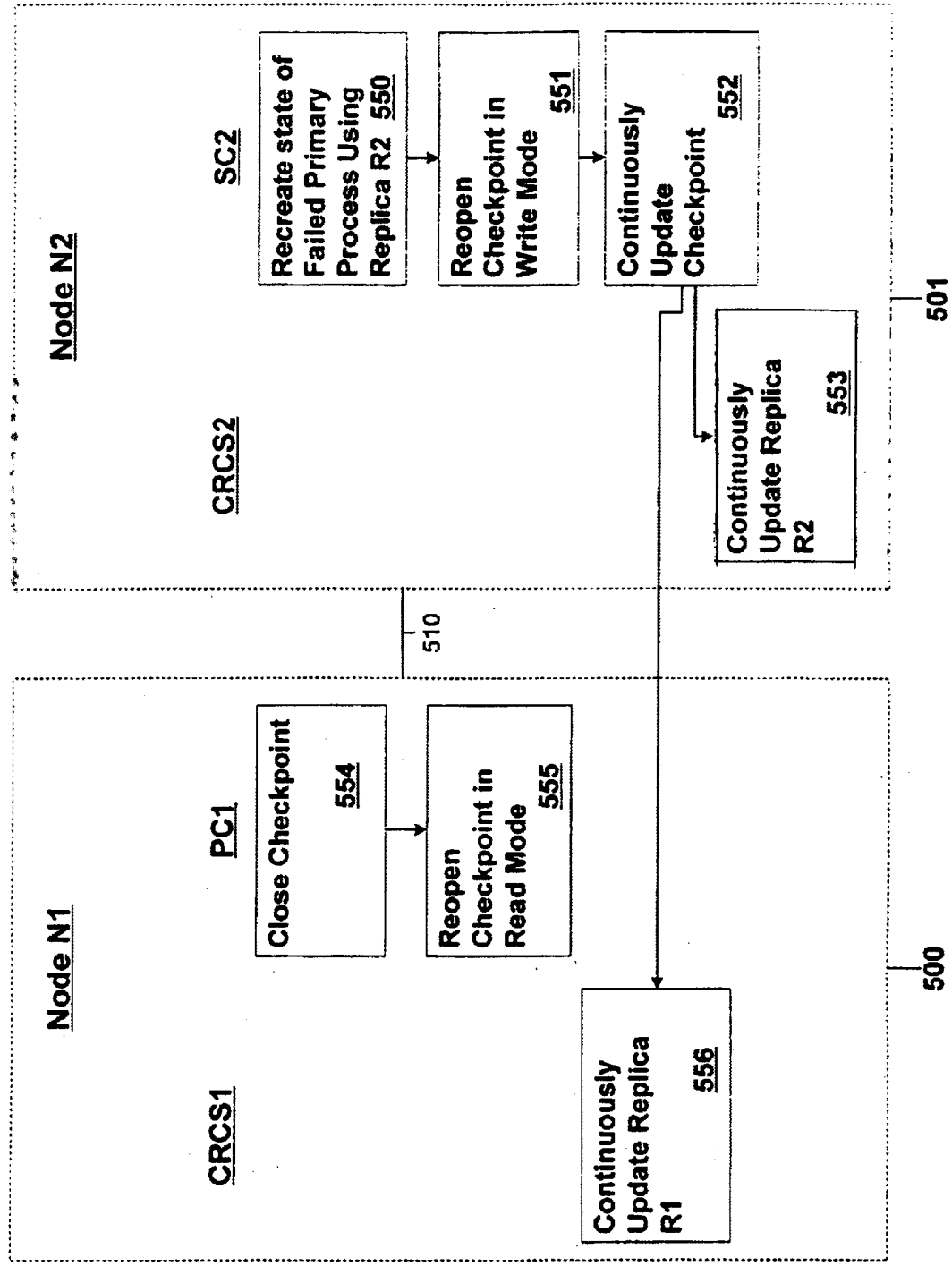

FIGS. 4A, 4B, and 4C are flow diagrams, illustrating some of the operations involved in managing a checkpoint in accordance with an embodiment of the present invention. FIGS. 4A–4C show operations that may be performed to provide a prompt and seamless fail-over when a primary component running on a node N1 500 fails. It is important to note that FIGS. 4A–4C are only examples that illustrate operations of one embodiment of the present invention. As such, the purpose of this example is not to cover all-possible errors or operations, but instead to explain the present invention by providing some of the operations involved in a few specific fail-over scenarios.

In this embodiment, a primary component PC1 resides on a node N1 501 and a secondary component SC2 resides on a node N2 501. The nodes N1 500 and N2 501 are connected to each other via a network 510.

Referring first to FIG. 4A, on the node N1 500, the primary component PC1 opens and creates a checkpoint at step 502. Typically, the primary component may create a checkpoint using a global name. Upon creation of the checkpoint, a new entry may appear in a name space for checkpoints. This entry may be used subsequently to refer to the newly created checkpoint. The name space may be managed using the Name Service Application Programming Interface ("Name Service API"). An example of such Name Service API includes lightweight directory access protocol ("LDAP") API.

At step 502, the checkpoint is opened in a write mode. At step 503, a cluster replicated checkpoint service for the node N1 (i.e., CRCS1) creates and initializes a replica R1. The replica R1 is created in a memory of the node N1 500 and then initialized. After a successful completion of the initialization step (503), the state of the replica R1 is set to EMPTY.

The primary component PC1 continuously updates the checkpoint at step 504. At step 505, the replica R1 on the node N1 500 is also continuously updated by the CRCS1 to reflect information in the checkpoint. Provided that there is no error in the updating process, the state of the replica R1 goes to and remains in CHECKPOINTING.

At some point, the secondary component SC2 is initiated on the node N2 501. At step 506, the secondary component SC2 opens the checkpoint in a read mode. This step typically happens after step 500. However, the SC2 may create a checkpoint before opening it in a read mode, if the checkpoint has not been created yet.

At step 507, a cluster replicated checkpoint service on the node N2 (i.e., CRCS2) creates and initializes a replica R2 on the node N2 501. During this initialization process, the primary component PC1 may update to the checkpoint and the CRCS1 may update the replica R1. However, when this initialization step 507 is completed, the replicas R1 and R2 may be made identical, and their states may correspond to CHECKPOINTING, absent any intervening errors in a synchronization step. At step 508, the CRCS2 continuously updates the replica R2 to reflect changes in the corresponding checkpoint.

In this embodiment, it is the responsibility of the checkpoint management to remember that replicas are on the nodes N1 500 and N2 501. While the primary component updates the checkpoint, the checkpoint management updates the replicas R1 on the node N1 500 and the replica R2 on the node N2 501. Checkpoint messages containing information regarding the checkpoint may be used to notify all the nodes that have opened the checkpoint.

Turning now to FIGS. 4B and 4C, embodiments of a failure recovery procedure of the present invention is explained. Specifically, FIGS. 4B and 4C represent two scenarios that may occur upon a failure of the primary component PC1. In both scenarios, the checkpoint is used to recreate the last consistent state of the primary component PC1. In the scenario of FIG. 4B, the primary component PC1 is restarted using the replica R1. In this scenario, the checkpoint is kept on the local node and thus the restart operation can be performed very efficiently. In the scenario of FIG. 4C, the secondary component SC2 takes over the role of primary using the replica R2. This may occur when an attempt to restart the primary component PC1 fails or when one decides that the secondary component SC2 should take over upon failure of the primary component PC1, for example.

As discussed in the previous paragraph, the scenario of FIG. 4B typically occurs upon failure of the primary component PC1. In order to restart the failed primary component PC1, the primary component PC1 reopens the checkpoint in a read/write mode at step 521. At step 522, the primary component PC1 obtains the last valid data before its crash from the replica R1. Once this step is completed, the primary component PC1 resumes its operation—it continuously updates the checkpoint at step 523. The CRCS1, in turn, continuously updates the replica R1 in the node N1 at step 524.

Preferably, the retention time for the replica R1 is set to a value greater than the time needed for the primary component PC1 to restart. The retention time defines how long a replica remains in memory after the last process which previously opened it on that node, closes it. This parameter may be specified when a replica is created and may be modified later on. By assigning the retention time for the replica R1 a value greater than the time needed for the primary component PC1 to restart, the primary component PC1 may be restarted using its local replica R1, making it unnecessary to copy information from a replica on a remote node after reopening the checkpoint. If the replica R1 no longer exists at step 522, the CRCS1 may have to access corresponding replicas on other nodes, for example, the replica R2 on the node N2 to initialize a new replica on the node N1 500.

Once the PC1 resumes its operation, the CRCS2 also updates the replica R2 to reflect changes in the checkpoint at step 525.

FIG. 4C illustrates exemplary operations that may take place if one decides that the secondary component SC2 on the node N2 501 should take over the role of primary from the failed primary component PC1 on the node N1 500. In this scenario, the secondary component SC2 becomes a new primary component by using the content of the replica R2 on the node N2 501 to recreate the last valid state of the failed primary component at step 550. Provided that the operation of closing the checkpoint on the former primary node N1 500 at step 554 completes successfully, the state of the replica R2 on the node N2 501 at step 550 is COMPLETED.

At step 551, the new primary component SC2 reopens the checkpoint to acquire a write access on it. The state of the replica R2 stays in COMPLETED until the new primary component SC2 performs a write operation. At step 552, the new primary component SC2 continuously updates the checkpoint. At step 553, the replica R2 on the node N2 501 is also continuously updated by the CRCS2.

If one decides to restart the previous primary component PC1 as a new secondary component, the new secondary component on the node N1 500 reopens the checkpoint in a read mode at step 555. At step 556, the replica R1 is updated to reflect changes in the checkpoint made by the new primary component SC2.

Consistency of Replicas on Various Nodes

In an embodiment where primary and secondary components exist on different nodes, multiple replicas may reside on different nodes. When multiple crcs_pread and/or crcs_pwrite operations occur at the same time, one may impose certain consistency rules for replicas based on where they reside. For example, one may impose a strong consistency on a local node and a weak consistency among remote nodes. Further, in order to guarantee the atomicity of crcs_pread and crcs_pwrite operations in a cluster, one may put a maximum limit to the size of data that can be read or written in a single operation.

When multiple crcs_pread and crcs_pwrite operations occur on a local replica, various problems could arise. For example, when a multi-threaded process attempts to update a checkpoint in a thread, and at the same time attempts to read some data from the checkpoint in another thread, such operations may need to be coordinated. One possible rule for coordinating such operations may be to: (1) maintain atomicity at crcs_pread and crcs_pwrite operation levels on a local replica; and (2) maintain the orderings of the crcs_pread and crcs_pwrite operations on a local replica. This rule ensures that: (1) crcs_pread and crcs_pwrite operations on overlapping ranges of a checkpoint are sequentialized; and (2) if a crcs_pwrite operation has completed, any following crcs_pread operation returns the data previously written.

When multiple crcs_pread and/or crcs_pwrite operations occur among remote replicas, one also needs to be concerned about synchronizing the remote replicas. Before discussing synchronization of the remote replicas, it is worth making an analogy with synchronization occurring between a file system buffer cache and a disk during file updates. In a default mode, when a write call returns, the buffer cache has been updated but the disk will be updated later in an asynchronous way. There is also an explicit "fsync" operation associated with this asynchronous mode, which forces synchronization of all updates in the buffer cache to the disk.

A very similar default mode may be used for the checkpoint mechanism. Specifically, when a crcs_pwrite call returns, a local replica has been updated, but remote replicas will be updated later, in an asynchronous manner. There may also be an explicit call, crcs_fsync, to force synchronization among various replicas.

At any given time, it may be preferable to have only one node with components or processes that have a checkpoint open for writing so that no distributed crcs_pwrite operations occur in parallel. It may also be preferable to maintain atomicity at the crcs_pread and crcs_pwrite operation levels among remote replicas. For example, if a process P1 on a node N1 performs a crcs_pwrite operation on a replica R1, and if a process P2 on a node N2 starts a crcs_pread operation on a replica R2, the system may guarantee that the data read by the process P2 has not been partially modified by the crcs_pwrite operation on the node N1. Further, one may need to consider an ordering on crcs_pread and crcs_pwrite operations among remote replicas. For example, the data read by the process P2 after the process P1 returns from the crcs_pwrite operation, may or may not correspond to the latest data written by the process P1. However, after explicit synchronization by using, for example, a crcs_fsync function call, the system may guarantee that the crcs_pread operation returns the latest data—in other words, the data read by the process P2 corresponds to the latest data written by the process P1. Finally, one may impose a rule that crcs_pwrite operations performed by one thread are propagated to remote nodes in an ordered fashion.

Checkpoint Characteristics

Checkpoint characteristics include a format, states for replicas, control blocks for replicas, and attributes. In addition to these characteristics, this section discusses one embodiment of a checkpoint deletion operation.

The format of a checkpoint, i.e., the way a process stores information, is typically process specific. For example, one process may decide to rely on an incremental checkpoint mechanism, whereas another process may prefer a non-incremental way of storing information. However, in order to allow a secondary process to take over, different processes that have opened the same checkpoint are aware of the format of the associated checkpoint.

As discussed above, a replica may be in different states. Such states may include EMPTY, CHECKPOINTING, CORRUPTED, MISSED, and COMPLETED. States may be retrieved by a component using a crcs_fstat function call. Function calls that could modify the state of a replica include crcs_pwrite, crcs_valid, crcs_resync, crcs_close, crcs_reset, and crcs_fsync. They are described in detail in the next section.

Different behaviors may be observed when performing operations that can change the state of a replica. Such behaviors include: (1) change the state of a replica whether or not an operation performs successfully; (2) change the state of a replica only if an operation succeeds; and (3) change the state of a replica only if an operation does not perform successfully. The first behavior may be appropriate, for example, in a case where a replica is in the EMPTY state and there is a crcs_pwrite operation—that is, if everything goes right, the state is set to CHECKPOINTING, but if an error occurs, its goes to CORRUPTED or MISSED. In either case, the state of the replica is changed. The second behavior may be used, for example, in a case where a replica is in the MISSED state and a crcs_resync operation is performed. In this case, there is an attempt to resynchronize the replica with a remote replica whose state is CHECKPOINTING or COMPLETED. In this case, the state changes from MISSED to CHECKPOINTING or COMPLETED, only if the crcs_resync operation succeeds. Finally, as to the third behavior, it may be appropriate in a case where a replica is in the CHECKPOINTING state and a crcs_pwrite operation occurs. In this case, if things go wrong, the state of the replica is changed to CORRUPTED or MISSED. Otherwise, it remains in the CHECKPOINTING state.

For a given replica, if all the operations on the replica are performed successfully, the state of the replica is either EMPTY, CHECKPOINTING or COMPLETED. These three states are considered valid states. The state of the replica changes from EMPTY to CHECKPOINTING after a first successful crcs_pwrite operation. The state changes from CHECKPOINTING to COMPLETED after a last process having the checkpoint open for writing closes it. The state changes from COMPLETED to CHECKPOINTING after a first successful crcs_pwrite operation.

If an operation to write data to a replica, including a crcs_open, crcs_pwrite, or crcs_fsync operation, fails, the state of the replica may either be CORRUPTED or MISSED. The two states are considered invalid states. Once the replica is in a CORRUPTED or MISSED state, error recovery procedures, such as crcs_reset, crcs_valid, and crcs_resync, may be performed to change the state of the replica into a valid one.

A replica may contain a special area called a control block. The size of a control block is an attribute of a checkpoint and thus may be specified when creating a checkpoint. Each replica may have a control block associated with it.

Once a checkpoint is opened, operations may be performed on different control blocks corresponding to different replicas of the checkpoint. Such operations on control blocks may include: (1) crcs_cb_pread, which allows a component to read a sequence of bytes in the control block attached to a replica; and (2) crcs_cb_pwrite, which allows a component to write a sequence of bytes in the control block attached to a replica. These operations may be defined so that a component does not need to have a checkpoint open for a write mode to write into the control block associated to one of checkpoint replicas in a cluster. Further, one may synchronize crcs_cb_pread and crcs_cb_pwrite operations to ensure data consistency. In addition to crcs_cb_pread and crcs_cb_pwrite, one may define an operation called crcs_node_list to allow a component to retrieve a list of nodes that have a checkpoint replica.

Checkpoints may have a set of attributes. They are typically provided when creating a checkpoint. Some of them may be modified after a checkpoint has been opened. Examples of checkpoint attributes include size, rtn_time, and cb_size. The size attribute defines a size in bytes of replicas of the checkpoint. The rtn_time attribute specifies how long a replica remains on a node after the corresponding checkpoint is not opened locally anymore and may be used when conducting a garbage collection. This attribute may be set at checkpoint creation time. However, one may define it so that its value may be subsequently changed for each replica. The cb_size attribute specifies the size of a control block. It may be defined so that for a given checkpoint, replicas associated with the checkpoint have control blocks of the same size, i.e., the size specified by the cb_size attribute. This attribute may be specified at checkpoint creation time. Typically, its value remains the same throughout the life of a checkpoint.

Finally, one embodiment of a checkpoint deletion process is explained. The deletion process preferably needs to account for the situation where different replicas associated with the checkpoint to be deleted reside on different nodes. One embodiment of the deletion process may include at least two steps. First, the name of a checkpoint is removed from the name space. Once deleted, the global name associated with the deleted checkpoint may no longer be valid. Second, memories associated to replicas of the checkpoint to be deleted are freed. However, a memory of a replica is kept if at least one component still has the checkpoint open on that node or if the retention time for the replica has not expired.

Function Calls

One may define various function calls to implement the present invention. This section explains in detail some of those functions that may be used in one embodiment of the present invention. One of ordinary skill in the art will appreciate that these functions are given as examples to illustrate one specific embodiment. In other words, one of ordinary skill in the art will appreciate that the present invention does not depend on specific implementation of various functions. One may eliminate or modify functions described in this section and still implement the present invention. Further, one may add additional functions. The present invention includes all such equivalent alterations and modifications of functions.

CRCS_OPEN: The crcs_open operation may be defined to open and/or create a checkpoint and to return a new checkpoint descriptor to access a replica on a local node. A checkpoint may be globally identified throughout the cluster by its name, which is specified when the checkpoint is first created. If the call cannot complete before the expiration of a user-specified time, all resources may be freed and the call may return with an error. When creating the checkpoint, checkpoint attributes may be defined. Such attributes may include a size of replicas, a size of a control block, and a retention time.

The checkpoint, once opened, remains usable by a process that opened it until it is closed by a successful call to crcs_close, or until the process dies. In such a case, the replica may remain cached on the node until its retention time expires.

A checkpoint may be accessed in a read, write, or read/write mode. Typically, a process, when opening a checkpoint, requests a desired mode of access. Such request is granted, for example, if the process would be granted a read or write access to a file with equivalent permissions. In one embodiment, only one node may have processes that have a checkpoint open in a write mode. This node is selected after the first process opens a checkpoint in a write mode. However, another process may later force this node to give up its write mode by forcing a replica to be opened with a write mode. When this happens, further attempts to write to the checkpoint on the first node using a previously opened checkpoint descriptor may return an error.

If a checkpoint does not exist when a process issues a crcs_open call, a new checkpoint may be created. One may allow the process to specify various attributes of the checkpoint. Once created, the state of the associated replica may be set to EMPTY. If the size of the checkpoint is set to a value that is greater than 0, a memory is allocated and initialized, for example, by filing it with 0 on the node where this replica is created.

If the checkpoint already exists but there is no replica on the node at the time the crcs_open call is issued, a replica may be created on the node. There may also be an attempt to initialize the new replica with another valid replica. The crcs_open call may block until this initialization has been achieved—i.e., crcs_pwrite operations occurring during the creation of a new replica can still occur, but they may be propagate& to this new replica after the initialization has completed. If this operation of synchronization succeeds, its state may be set to EMPTY, CHECKPOINTING, or COMPLETED. Otherwise it may be set to MISSED or CORRUPTED.

CRCS_CLOSE: The crcs_close operation may be defined to free a previously allocated checkpoint descriptor. Once the crcs_close operation is performed, a further reference to this checkpoint descriptor may return an error. If there are no more processes that have the checkpoint open for writing, this operation may also change the state of the replicas from CHECKPOINTING to COMPLETED. If the replica was opened for writing, this call may asynchronously trigger a crcs_fsync operation, synchronizing replicas in the cluster.

CRCS_FSTAT: The crcs_fstat call may be used to obtain attributes and/or status of a designated replica. The call may be defined so that an application issuing this call is to specify a checkpoint description previously returned by the crcs_open call, identify the node where the replica resides, and specify a location to which information is to be returned.

CRCS_PREAD: The crcs_pread operation may attempt to read from a local replica. Specifically, it may attempt to read from the replica referenced by a checkpoint descriptor previously returned by a crcs_open operation into a buffer. An error may be returned, for example, if an attempt is made to read beyond the end of the checkpoint. This operation may block if there are concurrent crcs_pwrite operations that occur in parallel.

CRCS_PWRITE: The crcs_pwrite operation may be used to write data into a checkpoint referenced by a checkpoint descriptor previously returned by a crcs_open call. The crcs_pwrite operation typically returns immediately after the local replica has been updated. Remote replicas, if any, may or may not already have been updated after this operation returns.

For example, if there are two replicas R1 and R2, and if two updates U1 and U2 that correspond to two distinct crcs_pwrite operations occur, the ordering is done in such a way that U1 arrives before U2 to any replica. More specifically, in this example, various situations can happen, including (1) U1 to R1, U2 to R1, U1 to R2, and finally U2 to R2 and (2) U1 to R1, U1 to R2, U2 to R1, and finally U2 to R2. In all situations, however, U1 arrives to R1 before U2 arrives to R1, and U1 arrives to R2 before U2 arrives to R2.

This operation may modify the state of a local replica. The local replica may become CORRUPTED, if the process dies while performing the crcs_pwrite operation. If such scenario occurs, the call may not return and the local replica may go to the CORRUPTED state. Further crcs_pwrite operations may not be allowed and may return with an error.

CRCS_FSYNC: The crcs_fsync operation may be used to synchronize replicas in the cluster. This call may be defined so that it ensures that previous crcs_pwrite operations are flushed to remote replicas in the cluster. The use of this call may be restricted to processes that have the checkpoint open for write mode. This call may block any further operations until all the remote replicas have been updated.

If one of the remote replicas cannot be updated, for instance, because of network congestion, for example, it goes to the MISSED state, and an error is returned. Further crcs_fsync calls may continue updating valid remote replicas, if any, but replicas in the MISSED states may no longer be updated.

CRCS_VALID: The crcs$_{13}$valid call may be used to set the state of a replica to CHECKPOINTING. This call may be used to bring a replica in the CORRUPTED or MISSED state to the CHECKPOINTING state.

CRCS_RESET: The crcs_reset operation may be used to reset a named checkpoint. This call may be used to reset all the replicas corresponding to the named checkpoint. Specifically, this call may reinitialize all the replicas corresponding to the named checkpoint and set their states to EMPTY. This call may be limited to a caller with a write permission to the checkpoint.

CRCS_SETRTN: The crcs_setrtn call may be used to set the retention time of a replica. Specifically, this call may be used to set the retention time of the local replica referenced by the checkpoint descriptor previously returned by a crcs_open operation.

CRCS_NODE_LIST: The crcs_node_list operation may be used to obtain a list of nodes with replicas of a named checkpoint. This call may return, for example, an array of node identifiers, identifying those nodes where the checkpoint referenced by the checkpoint descriptor previously returned by a crcs_open operation, is currently opened, including the local node where this call is performed.

CRCS_RESYNC: The crcs_resync call may be used to resynchronize a designated replica with a remote valid one. If the designated replica is not in the MISSED or CORRUPTED state, this call has no effect. Otherwise, and if there is another replica in the cluster in the CHECKPOINTING or COMPLETED state, this call causes the designated replica to get resynchronized. If the operation is successful, the new state of the replica is the same as that of the remote replica that has been used for resynchronization. If there are several remote replicas in a valid state, any one of them may be chosen. If the operation fails while in progress, the state of the designated replica becomes CORRUPTED. One may specify the upper bound on the time that this operation is to be performed. If the operation cannot complete within the specified time, the state of the replica becomes MISSED.

CRCS_CB_PREAD: The crcs_cb_pread operation may be used to read data from the control block of a designated replica. A replica may be designated by defining a node where the replica resides and a checkpoint descriptor previously returned by a crcs_open operation. This operation may block if there are concurrent crcs_cb_pwrite operations that occur in parallel.

CRCS$_{CB}$_PWRITE: The crcs_cb_pwrite operation may be used to write data into the control block of a designated replica. A replica may be designated by defining a node where the replica resides and a checkpoint descriptor previously returned by a crcs_open operation. This operation may block if there are concurrent crcs_cb_pwrite operations that occur in parallel.

CRCS_UNLINK: The crcs_unlink operation may be used to delete an existing checkpoint. Once deleted, the global name associated with the deleted checkpoint is no longer valid. However, local replicas on different nodes may remain accessible to processes that have the deleted checkpoint open. After the checkpoint has been deleted, the retention time may have no effect and local replicas may be deleted as soon as no process has the deleted checkpoint open.

CRCS_CONF_GET: The crcs_conf_get operation may be used to get configurable CRCS variables. Examples of configurable CRCS variables may include a maximum size for crcs_pwrite and crcs_pread operations, a maximum number of vectors per crcs_pwrite operation, a maximum number of checkpoints open per client, a maximum number of replicas for a checkpoint in a cluster, a maximum number of clients that can access a CRCS on a given node, and/or default timeout for implicit-bounded call, for example.

Attachment A includes an example illustrating a very simple application, which uses the checkpoint services with the functions described in this section to recover from a fail-over scenario.

One of ordinary skill in the art will now appreciate that the present invention provides a method and system for providing cluster replicated checkpoint services. The method and system includes function calls used to manage checkpoints and their replicas. It will be apparent to those skilled in the art that various modifications and variations can be made in the present invention without departing from the spirit or scope of the invention. Thus, it is intended that the present invention covers the modifications and variations of this invention provided that they come within the scope of any claims and their equivalents.

Attachment A

```
#include <sys/types.h>
#include <sys/stat.h>
#include <fcntl.h>
#indude <stdlib.h>
#include "crcs.h"
/* Checkpoint attributes. */
#define SIZE 0x5000
#define CB_SIZE 0x1000
#define RET_TIME 10
/* Upper bound limit for crcs_open 1.5 sec. */
#define TV_SEC_OPEN_BOUND 1
#define TNVSE_OPEN_BOUND 0
/* Number of consecutive range to be written per crcs_pwrite
operation. */
#define NB_VEC 1
/* Interaction with HA services. */
typedef enum HAState {
    PRIMARY = 0,
    SECONDARY,
    SPARE,
    EXIT
} HAState_t;
extern HAState_t hastate;
extern void HAInit ( );
/* Application code */
typedef enum status_job {
    NOT_INIT          = 0,
    WRITE_ONLY        = 1,
    WRITE_SYNC        = 2
} status_job_t;
extern void          do_spare_job ( );
extern void          do_secondary_job ( );
extern status_job_t  do_primary_job (void**, size_t*, off_t*);
extern void          init_new_primary (void*, size_t);
extern char*         ckpt name;
extern cmm_nodeid_t nodeid;
    int
main (int argc, char* argv [ ])
{
```

-continued

```
status_job_t         res_job          = NOT_INIT
void*                buf_rd           = NULL;
void*                buf_wr           = NULL;
int                  cur_read         = 0;
int cur_off                           = 0;
unsigned long        max_io = 0;
mode_t               mode = 0;
off_t                offset = 0;
size_t               size = 0;
crcs_t               cdesc = (crcs_t) - 1;
crcs_error_t         res = CRCS_EUNEXPECTED;
crcs_attr_t          cattr = {0, 0, {0, 0}};
crcs_stat_t          cstat = {0, {0, 0, {0, 0}}};
crcs_io_vec_tvec [NB_VEC] = {0, 0, NULL};
struct timespec      tv_bound = {0, 0};
HAInit ( );
tv_bound.tv_sec = TVSEC_OPEN_BOUND;
tv_bound.tv_nsec = TNVSEC_OPEN_BOUND;
/* Retrieve CRCS configurable variables. */
res = crcs_conf_get (CRCS_CONF_IO_MAX, & max_io);
if(res != CRCS_OK) {
exit (1);
    }
/*
* When notified by some HA entities,
* the application changes, its state (hastate):
* - PRIMARY (does active job, and uses the checkpoint mechanism
      to save its state)
* - SECONDARY (opens the checkpoint to create the local copy
      on the node where it runs.)
* - SPARE (does nothing)
* - EXIT (application exits and destroys the checkpoint)
*/
for (;;) {
if (hastate == EXIT) {
res = crcs_unlink (ckpt_name);
if (res != CRCS_OK) {
exit (1);
}
exit (0);
}
if (hastate == SPARE) {
do_spare_job ( );
}
if (hastate == PRIMARY) {
/*
* If checkpoint does not exist, set the
* attributes for the creation
*/
cattr.rtn_time.tv_sec = RET TIME;
cattr.rtn_time.tv_nsec = 0;
cattr.size = SIZE;
cattr.cb_size = CB_SIZE;
mode = S_IRWXU | (S_IRGRP | S_IXGRP) | (S_IROTH |
      S_IXOTH);
res = crcs_open (ckpt_name, 0_RDWR | O_CREAT, mode,
      & cattr, & tv_bound, & cdesc);
if (res != CRCS_OK) {
exit (1);
}
/*
* If a failover has occurred, this is the new PRIMARY:
* -> Retrieve its state from the checkpoint.
*/
res = crcs_fstat (cdesc, nodeid, &cstat);
if (res != CRCS_OK) {
exit (1);
}
if ((cstat.state != CRCS_EMPTY) &&
(cstat.state != CRCS_CORRUPTED) &&
(cstat.state != CRCS_MISSED)) {
buf_rd = malloc(SIZE);
if (buf_rd == NULL) {
exit (1);
}
cur_off = 0;
while (cur_off < SIZE) {
      if ((cur_read = SIZE - cur_off) >= max_io) {
            cur_read = max_io;
```

-continued

```
}
res = crcs_pread (cdesc, cur_read, cur_off,
      (char*) buf_rd + cur_off, NULL);
if (res != CRCS OK) {
free (buf_rd);
exit (1);
}
cur_off += cur_read;
}
init_new_primary (buf_rd, SIZE);
free (buf_rd);
}
while (hastate == PRIMARY) {
/* Perform its job. */
res_job = do_primary_job (&buf_wr, &size, &offset);
/* Write to the checkpoint. */
vec [0].size        = size;
vec [0].offset      = offset;
vec [0].buf         = buf_wr;
res = crcs_pwrite (cdesc, vec, NB_VEC);
if (res != CRCS_OK) {
exit (1);
}
if (res_job == WRITE_SYNC) {
res = crcs_fsync (cdesc);
if (res != CRCS OK) {
exit (1);
}
}
}
res = crcs_close (cdesc);
if (res != CRCS_OK) {
exit (1);
}
}
/*
* This is the SECONDARY.
* Open the checkpoint so, that a new replica is created on the node.
*/
if (hastate == SECONDARY) {
res = crcs_open (ckpt_name, O_RDONLY, 0, 0, & tv_bound,
      & cdesc);
if(res != CRCS_OK) {
exit (1);
}
    while (hastate == SECONDARY) {
    do_secondary_job ( );
    }
    res = crcs_close (cdesc);
    if(res != CRCS_OK) {
    exit (1);
      }
    }
  }
  return - 1;
}
```

What is claimed is:

1. A method for providing cluster replicated checkpoint services for a plurality of replicas of a checkpoint in a cluster, the cluster comprising a first node and a second node, which are connected to one another via a network, and the plurality of replicas comprising a primary replica and a secondary replica, the method comprising:

managing the checkpoint, the checkpoint containing checkpoint information;

creating the primary replica in a memory of the first node, the primary replica containing first checkpoint information;

updating the primary replica so that the first checkpoint information corresponds to the checkpoint information;

creating the secondary replica in a memory of the second node, the secondary replica containing second checkpoint information, wherein the primary replica and the secondary replica each have a state;

updating the secondary replica so that the second checkpoint information corresponds to the checkpoint information;

maintaining the state of the primary replica; and maintaining the state of the secondary replica;

wherein the state of the primary replica and the state of the secondary replica are EMPTY, CHECKPOINTING, MISSED, COMPLETED, or CORRUPTED.

2. The method of claim 1, wherein the updating the secondary replica step uses a checkpoint message.

3. The method of claim 2, further comprising: formatting the checkpoint message based on version information.

4. The method of claim 1, wherein the two updating steps are asynchronous.

5. The method of claim 1, further comprising:

executing an error recovery procedure if either the state of the primary replica or the state of the secondary replica is invalid.

6. The method of claim 1, further comprising:

executing an error recovery procedure if either the state of the primary replica or the state of the secondary replica is MISSED or CORRUPTED.

7. The method of claim 1, further comprising:

synchronizing the first checkpoint information in the primary replica and the second checkpoint information in the secondary replica.

8. The method of claim 1, further comprising:

retaining the primary replica in the memory of the first node until a retention time of the primary replica expires; and retaining the secondary replica in the memory of the second node until a retention time of the secondary replica expires.

9. The method of claim 1, further comprising:

conducting a garbage collection based on a retention time of the primary replica and a retention time of the secondary replica.

10. The method of claim 1, wherein the checkpoint has a plurality of checkpoint attributes.

11. The method of claim 1, wherein there is a control block associated with the primary replica and there is a control block associated with the secondary replica.

12. The method of claim 11, further comprising:

maintaining first control block information in the control block of the primary replica; and maintaining second control block information in the control block of the secondary replica.

13. The method of claim 12, further comprising:

formatting a checkpoint message using first control block information, second control block information, or both, wherein the checkpoint message is used in the updating the secondary replica step.

14. The method of claim 1, further comprising:

executing a failure recovery procedure.

15. The method of claim 14, wherein the executing step further comprises:

when a primary component on the first node fails, restarting the primary component using the primary replica.

16. The method of claim 14, wherein the executing step further comprises:

when a primary component on the first node fails, starting a secondary component on the second node as a new primary component using the secondary replica.

17. A method for providing cluster replicated checkpoint services for a plurality of replicas of a checkpoint in a cluster, the cluster comprising a first node and a second node, which are connected to one another via a network, the plurality of replicas including a primary replica and a secondary replica, the method comprising:

creating the checkpoint;

opening the checkpoint from the first node in a write mode;

creating the primary replica in a memory of the first node;

updating the checkpoint;

updating the primary replica;

propagating a checkpoint message, the checkpoint message including information regarding the checkpoint;

opening the checkpoint from the second node in a read mode;

creating the secondary replica in a memory of the second node, wherein the primary replica has a state and the secondary replica has a state;

updating the secondary replica based on the checkpoint message;

executing an error recovery procedure if the state of the primary replica or the state of the secondary replica is invalid.

18. The method of claim 17, wherein the propagating and the updating steps are asynchronous.

19. The method of claim 17, further comprising:

executing a failure recovery procedure.

20. The method of claim 19, wherein the executing step further comprises:

making a secondary component in the second node a new primary component using the secondary replica.

21. The method of claim 19, wherein the executing step further comprises:

restarting a primary component in the first node using the primary replica.

22. The method of claim 17, further comprising:

formatting the checkpoint message using version information.

23. The method of claim 17, further comprising:

deleting the primary replica based on a first retention time of the primary replica; and deleting the secondary replica based on a second retention time of the secondary replica.

24. The method of claim 17, further comprising:

conducting a garbage collection using a first retention time of the primary replica and a second retention time of the secondary replica.

25. The method of claim 17, wherein the memory of the first node has a first control block for the primary replica and the memory of the second node has a second control block for the secondary replica.

26. The method of claim 25, further comprising:

maintaining the first control block; and maintaining the second control block.

27. The method of claim 17, wherein the state of the primary replica and the state of the secondary replica is selected from the group consisting of EMPTY, CHECKPOINTING, MISSED, COMPLETED and CORRUPTED.

28. The method of claim 27, further comprising:

executing an error recovery procedure if the state of the primary replica or the state of the secondary replica is MISSED or CORRUPTED.

29. The method of claim 17, wherein the checkpoint has checkpoint attributes.

30. A computer program product configured to provide cluster replicated checkpoint services for a plurality of replicas of a checkpoint in a cluster, the cluster comprising a first node and a second node, which are connected to one another via a network, and the plurality of replicas comprising a primary replica and a secondary replica, the computer program product comprising:

computer readable program code configured to manage the checkpoint, the checkpoint containing checkpoint information;

computer readable program code configured to create the primary replica in a memory of the first node, the primary replica containing first checkpoint information;

computer readable program code configured to update the primary replica so that the first checkpoint information corresponds to the checkpoint information;

computer readable program code configured to create the secondary replica in a memory of the second node, the secondary replica containing second checkpoint information, wherein the primary replica and the secondary replica each have a state;

computer readable program code configured to update the secondary replica so that the second checkpoint information corresponds to the checkpoint information;

computer readable program code configured to maintain the state of the primary and the secondary replica, wherein the state of the primary replica and the state of the secondary replica are EMPTY, CHECKPOINTING, MISSED, COMPLETED, or CORRUPTED; and computer readable medium having the computer readable program codes embodied therein.

31. A computer program product configured to provide cluster replicated checkpoint services for a plurality of replicas for a checkpoint in a cluster, the cluster comprising a first node and a second node, which are connected to one another via a network, and the plurality of replicas comprising a primary replica and a secondary replica, the computer program product comprising:

computer readable program code configured to create the checkpoint;

computer readable program code configured to open the checkpoint from the first node in a write mode;

computer readable program code configured to create the primary replica in a memory of the first node;

computer readable program code configured to update the checkpoint;

computer readable program code configured to update the primary replica;

computer readable program code configured to propagate a checkpoint message, the checkpoint message including information regarding the checkpoint;

computer readable program code configured to open the checkpoint from the second node in a read mode;

computer readable program code configured to create the secondary replica in a memory of the second node;

computer readable program code configured to update the secondary replica based on the checkpoint message;

computer readable program code configured to execute an error recovery procedure if the state of the primary replica or the state of the secondary replica is invalid;

computer readable medium having the computer readable program codes embodied therein.

32. A system for providing cluster replicated checkpoint services for a plurality of replicas of a checkpoint in a cluster, the cluster comprising a first node and a second node, which are connected to one another via a network, and the plurality of replicas comprising a primary replica and a secondary replica, the method comprising:

means for managing the checkpoint, the checkpoint containing checkpoint information;

means for creating the primary replica in a memory of the first node, the primary replica containing first checkpoint information;

means for updating the primary replica so that the first checkpoint information corresponds to the checkpoint information;

means for creating the secondary replica in a memory of the second node, the secondary replica containing second checkpoint information, wherein the primary replica and the secondary replica each have a state;

means for updating the secondary replica so that the second checkpoint information corresponds to the checkpoint information;

means for maintaining the state of the primary replica;

means for maintaining the state of the secondary replica; and means for executing an error recovery procedure if either the state of the primary replica or the state of the secondary replica is invalid.

33. The system of claim 32, wherein the means for updating the secondary replica uses a checkpoint message.

34. The system of claim 33, further comprising: means for formatting the checkpoint message based on version information.

35. The system of claim 32, further comprising:

means for executing a failure recovery procedure.

36. The system of claim 32, further comprising:

means for maintaining a control block of the primary replica; and means for maintaining a control block of the secondary replica.

37. The system of claim 32, further comprising:

means for conducting a garbage collection based on a retention time of the primary replica and a retention time of the secondary replica.

38. A system for providing cluster replicated checkpoint services for a plurality of replicas of a checkpoint in a cluster, the cluster comprising a first node and a second node, which are connected to one another via a network, the plurality of replicas including a first replica and a second replica, the system comprising:

means for creating the checkpoint;

means for opening the checkpoint from the first node in a write mode;

means for creating the primary replica in a memory of the first node;

means for updating the checkpoint;

means for updating the primary replica;

means for propagating a checkpoint message, the checkpoint message including information regarding the checkpoint;

means for opening the checkpoint from the second node in a read mode;

means for creating the secondary replica in a memory of the second node, wherein the primary replica and secondary each have a state;

means for updating the secondary replica based on the checkpoint message; and means for maintaining the state of the primary and secondary replicas;

wherein the state of the primary replica and state of the secondary replica are selected from the group of states consisting of EMPTY, CHECKPOINTING, MISSED, COMPLETED, and CORRUPTED.

39. The system of claim 38, wherein the propagating means and the updating means operate asynchronously.

40. A system for managing a checkpoint, the system comprising;

a first node running a primary component and having an opened checkpoint, the first node further including a primary replica having first checkpoint information based on the opened checkpoint in its memory, having a first checkpoint service, and connected to a network; and a second node running a secondary component, including a secondary replica in its memory, having a second checkpoint service, and connected to the network, wherein the first checkpoint service and the second checkpoint service are capable of accessing the opened checkpoint, wherein the first checkpoint service works with the primary component to update the opened checkpoint, issue a checkpoint message containing information regarding the opened checkpoint, asynchronously propagate the checkpoint message, and update the first replica, and wherein the second checkpoint service is capable of asynchronously updating the secondary replica based on the checkpoint message.

41. A method for providing cluster replicated checkpoint services for a plurality of replicas of a checkpoint in a cluster, the cluster comprising a first node and a second node, which are connected to one another via a network, and the plurality of replicas comprising a primary replica and a secondary replica, the method comprising:

managing the checkpoint, the checkpoint containing checkpoint information;

creating the primary replica in a memory of the first node, the primary replica containing first checkpoint information;

updating the primary replica so that the first checkpoint information corresponds to the checkpoint information;

creating the secondary replica in a memory of the second node, the secondary replica containing second checkpoint information;

updating the secondary replica so that the second checkpoint information corresponds to the checkpoint information;

maintaining the state of the primary replica;

maintaining the state of the secondary replica; and executing an error recovery procedure if either the state of the primary replica or the state of the secondary replica is invalid.

* * * * *